No. 870,291. PATENTED NOV. 5, 1907.
G. J. HENRY, Jr.
REGULATING MEANS FOR WATER WHEEL NOZZLES.
APPLICATION FILED JUNE 9, 1903.

2 SHEETS—SHEET 2.

Witnesses.
Inventor

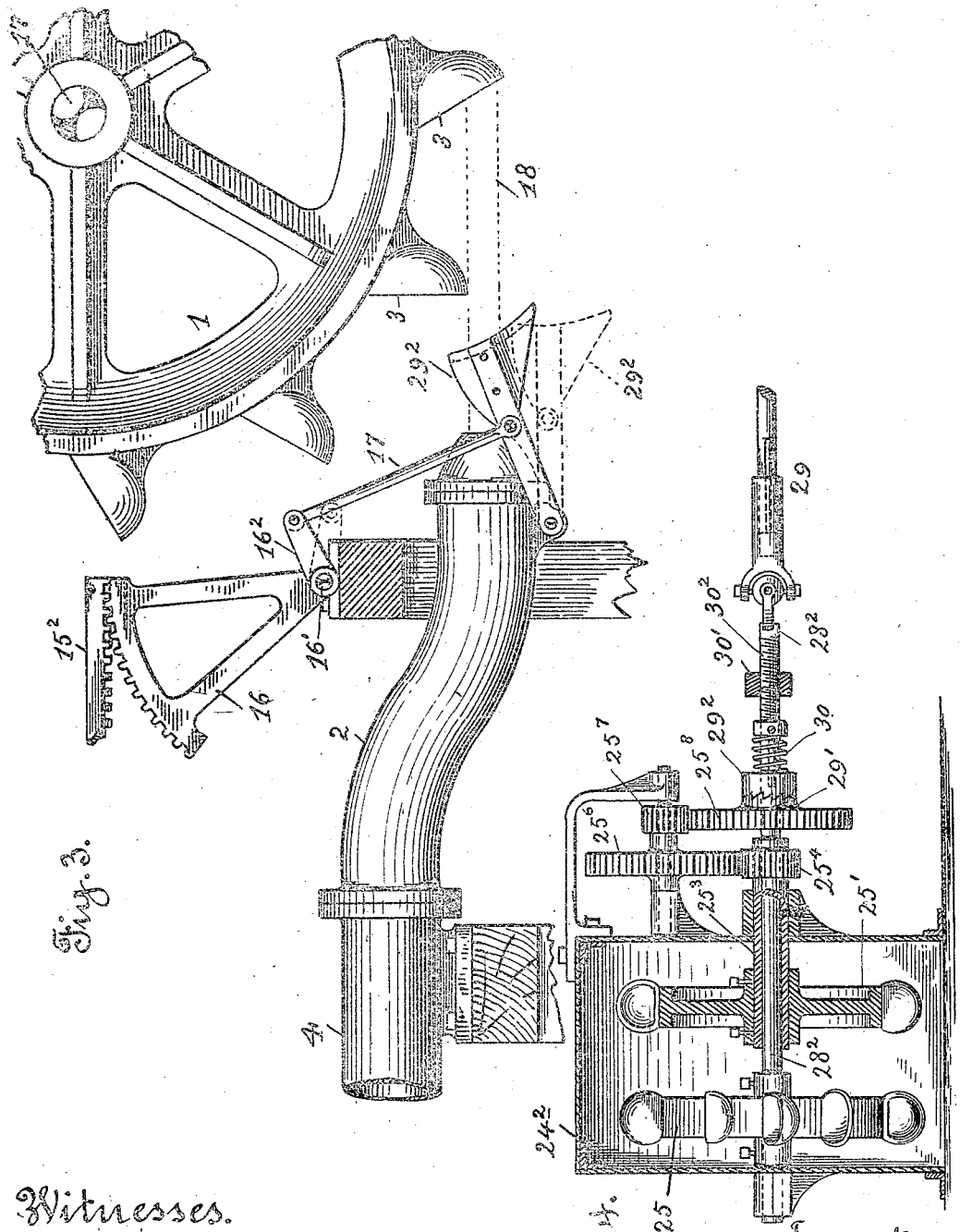

UNITED STATES PATENT OFFICE.

GEORGE J. HENRY, JR., OF SAN FRANCISCO, CALIFORNIA, ASSIGNOR OF ONE-HALF TO THE PELTON WATER WHEEL COMPANY, OF SAN FRANCISCO, CALIFORNIA, A CORPORATION OF CALIFORNIA.

REGULATING MEANS FOR WATER-WHEEL NOZZLES.

No. 870,291.      Specification of Letters Patent.      Patented Nov. 5, 1907.

Application filed June 9, 1903. Serial No. 160,735.

*To all whom it may concern:*

Be it known that I, GEORGE J. HENRY, Jr., a citizen of the United States, residing at the city and county of San Francisco, State of California, have invented certain new and useful Improvements in Regulating Means for Water-Wheel Nozzles; and I do hereby declare the following to be a full, clear, and exact description of the same.

The present invention comprises mechanism whereby the position of the nozzle for the impact stream for water wheels or hydraulic motors may be varied, that is, deflected or raised, in accordance with the load changes in the working of the wheel, with means for automatically regulating or varying the stream's diameter proportionate to the working requirements of the wheel, due to load variations, together with devices by which the controlling mechanism for the stream may be brought positively to a state of rest the moment the diameter of the stream has been regulated proportionately to the working requirements of the wheel as to load variations, the object of the invention being to provide quick, accurate, and automatic adjustment of the nozzle to vary the direction of discharge due to changed condition in the working load of the wheel and to automatically proportion the propelling stream for the wheel so as to regulate the same in accordance to the water power required to efficiently operate the wheel under varying and sudden changes as to the load placed thereon.

To comprehend the invention reference should be had to the accompanying sheets of drawings, wherein—

Figure 1:
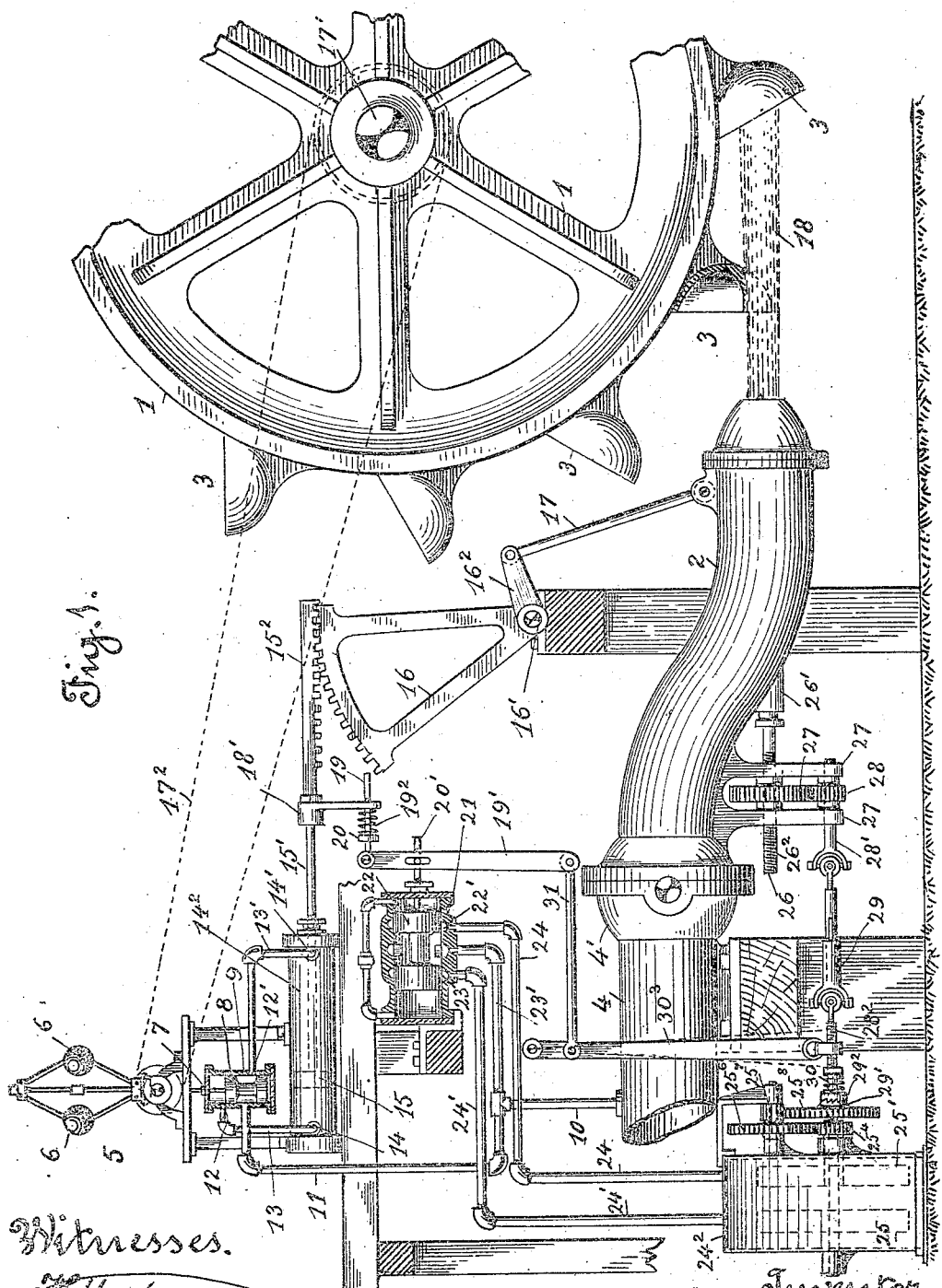
Figure 2:
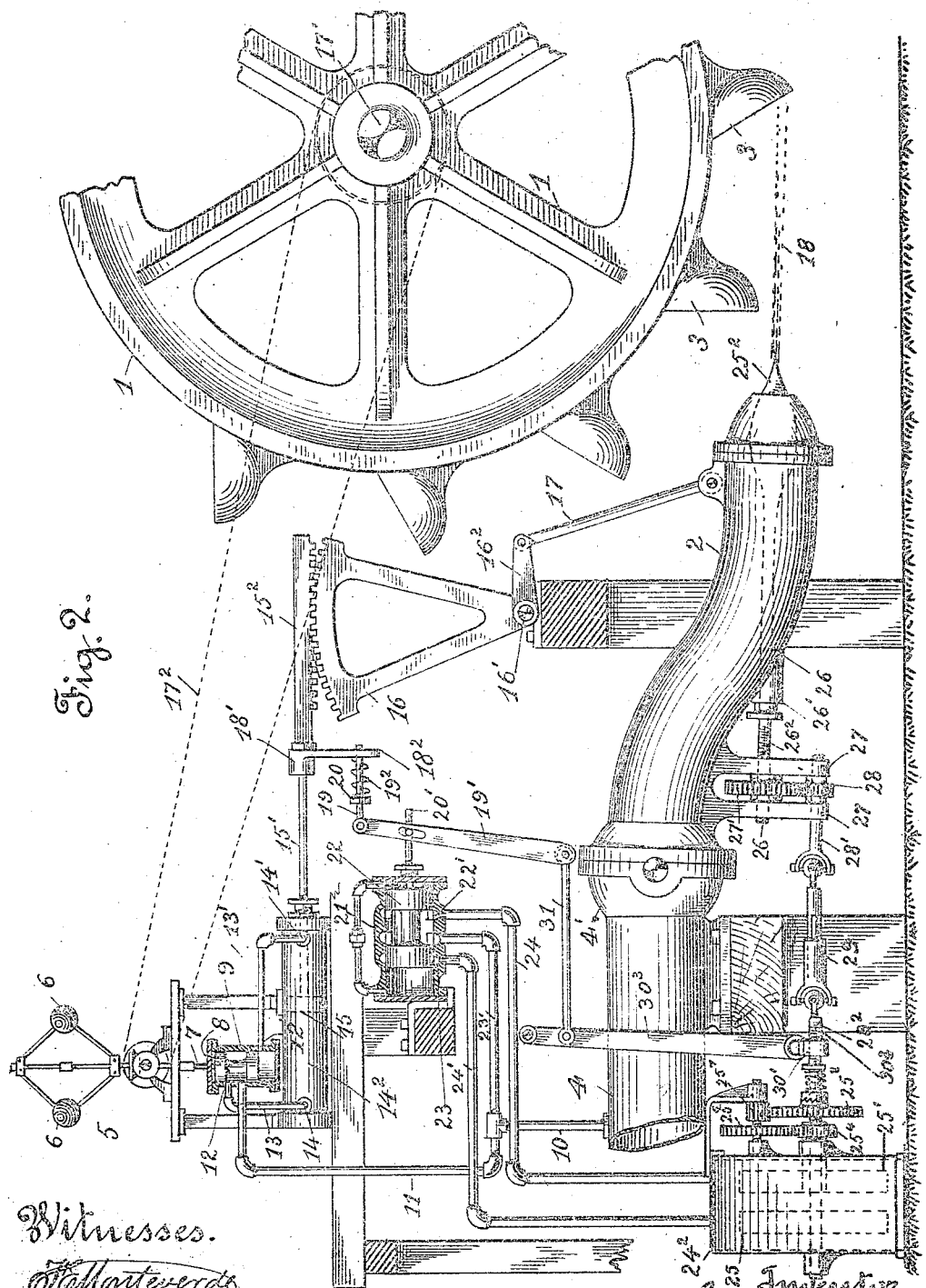

Figure 1 is a side view in elevation showing the position of the respective parts when the nozzle is in its normal position and the water wheel or motor working under full load, certain of the piston cylinders being sectioned to illustrate the pistons or valves working therein to control the ports for said cylinders; Fig. 2 is a view similar to Fig. 1, disclosing the abnormal position of the working parts, in this view the nozzle is shown deflected and the nozzle plug moved outward to reduce the outlet area of the nozzle in order to proportion the discharged stream to the changed working load of the motor, the pistons or valves being indicated to open the cylinder ports; the various parts being shown preparatory to the nozzle's return to its normal position, although the nozzle's plug is illustrated in the position which it assumes when the parts have returned to their closed or set position, as set forth in Fig. 1 of the drawings, with the return movement of the nozzle; Fig. 3 is a broken detail view disclosing a fixed or stationary nozzle with a directing or controlling gate for the discharge stream hinged thereto; and Fig. 4 is an enlarged detail part sectional view of the drive shaft, and its mechanism for imparting motion thereto for moving the nozzle's plug to close or open the outlet area of discharge for the nozzle.

The numeral 1 is used to indicate any suitable form of hydraulic motor, or water wheel, which is driven by an impelling jet issuing from the nozzle 2 impinging against the vanes, buckets, or blade 3 attached to the periphery of the said wheel 1. The nozzle 2 is what is known as a "deflecting nozzle", being secured to the main supply pipe 4 by means of a universal joint 4'. The position or elevation of this nozzle is controlled by the governor mechanism, which is governed by the variations as to the load working of the wheel. As the load varies, *i. e.* increases and decreases, the position of the nozzle 2 is altered in accordance therewith so as to cause only a portion of the impact stream of water to impinge against the buckets, vanes, or blades of the water wheel, or to place the full impact stream thereon. This adjustment of the nozzle is accomplished direct from the governor 5, the fly balls 6 of which are connected to a stem 7 of the balance slide valve 8 working within the cylinder 9. Water enters the cylinder 9 from the supply pipe 4, through the branch pipes 10, 11. From the outlet ports 12, 12' of the cylinder 9 lead the pipes 13, 13', which pipes connect respectively with the ports 14, 14', of the cylinder 14². Within this cylinder works the piston 15, the stem 15' of which extends a distance beyond the said cylinder. The outer end portion of the stem 15' is formed into a rack 15² which engages with the toothed quadrant lever 16. This lever is attached to one end of a rock shaft 16', to the opposite end of which is secured the arm 16², which arm is pivoted at its outer end to the upper end of the link 17. The link 17 at its lower end is pivoted to the nozzle 2. As thus connected the operation or movement of the said deflecting nozzle will be as follows: Presuming the nozzle to stand in the position illustrated by Fig. 1 of the drawings, position when the motor or wheel 1 is working under full load or normal condition, and the load of the motor or water wheel to be suddenly thrown off or lowered, the speed of the governor mechanism 5 will increase or run above normal and the fly balls 6 fly outward, which raises the valve stem 7 until the slide valve uncovers wholly or partially, according to the changed speed of the governor mechanism due to variation of the working load, the cylinder port 12. As the port 12 is thus uncovered the water or fluid pressure enters the cylinder 14² through the port 14 back of the piston 15 and forces the said piston outward. During this movement of the said piston, the stem 15' moves therewith causing the lever 16 to turn outward. The movement of the lever 16 rotates the rock shaft 16' to throw the outer end of the arm 16² downward, which, bearing onto the link 17 forces the outer end of the nozzle 2 downward or deflects the nozzle to such a degree that only a portion of the diameter of the impact stream 18 will bear or strike against the surface of the buckets, vanes, or blades 3 attached to the wheel's periphery. As the quantity of water thus placed onto the buckets, vanes or blades is lessened, it follows that the speed of the wheel is proportionately reduced. Such portion of the stream as does not impinge against the buckets or vanes ordinarily is wasted or runs into the wheel pit. To permit of such waste is not economic working. In order to provide against this waste of water, it is required that the water discharged from the nozzle be reduced either by the outlet area of the nozzle being partially closed to properly proportion the impact stream to the changed load working of the wheel, or the water supply to the nozzle must be throttled to cut down the quantity of water admitted to the nozzle for discharge. Preference is given to reducing the outlet area of the nozzle, but in so doing, as in throttling of the stream, care must be taken that pounding or water hammer in the pipe line be obviated. It will be understood that the governor mechanism is driven from the wheel shaft 17', the connection in the present case being by means of the belt 17².

To the piston stem 15' is adjustably fixed a block 18', the depending guide bracket 18² of which is fitted upon an arm 19 pivoted at one end to a vertical lever 19'. The bracket 18² is connected to a tension spring 19², which spring is also attached to a nut or collar 20 located on the arm 19. The vertical lever 19' has fastened thereto the outer end of a valve or piston rod 20', which rod works through the outer head of the controlling cylinder 21 and carries at its inner end a slide piston 22. This slide piston controls the outlet ports 22', 23 of the cylinder 21, which cylinder receives fluid under pressure from the branch pipe 10 through the connection 23'. From the outlet ports 22', 23 extend the pipes 24, 24', the nozzle end of which pipes extend into a casing 24² and are arranged to discharge respectively onto the independent motors 25', 25, located within said casing. These motors are used to impart longitudinal movement to the nozzle's plug 25², in order to move same outward and inward within the nozzle to decrease and increase the outlet area of the nozzle proportionate to variations in the wheel's load.

The regulating plug 25² is carried by the rod 26, which rod extends outside of the nozzle 2 through a stuffing gland 26' and works through guide brackets 27. To the plug rod 26, between the guide brackets, is rotatably secured a gear 27', which gear works upon the screw-threaded portion 26² of the rod 26 and meshes with and is driven by a pinion 28 carried by the short shaft 28'. This shaft works in bearings of the guide brackets 27 and is connected to the drive shaft 28² by the universal ball jointed connection 29. To this shaft 28² the motors 25 and 25' are secured, the motor 25 being fixed to the said shaft, while the motor 25' is attached to a sleeve 25³ loose upon the shaft 28². This sleeve carries a pinion 25⁴, meshing with gear 25⁶ which carries a pinion 25⁷ meshing with a gear 25⁸ loosely rotating on shaft 28² and carrying rigidly connected to it the half clutch 29' which engages with an opposing ratchet clutch 29² feathered to the drive shaft 28², said half clutch being held into engagement with the half clutch 29' by the pressure of the spring 30.

During the outward movement of the rod or stem 15', to deflect the nozzle 2, the block 18' is carried therewith, which block being attached to the spring 19² exerts a gradually increasing strain onto the arm 19, so that after the stem or rod 15' has moved a short distance, the increased strain placed onto the arm 19 serves to steadily pull the vertical lever 19' outward or in the direction of travel of the stem or rod 15'. This movement of the lever, through the medium of the piston rod 20', draws the piston 22 outward so as to uncover the outlet port 22' and permit the water under pressure to flow from the cylinder 21 into the pipe 24. The water thus admitted to the pipe 24 is discharged into the casing 24² and onto the motor 25'. As the motor is thus driven, its motion, through the medium of the clutch mechanism, drive shaft 28², and jointed connection 29, is transmitted to the shaft 28'. Rotation of the shaft 28' is conveyed to the rod 26, through the medium of the pinion 28 and gear 27', in order to feed the said rod forward so as to cause the nozzle plug 25² to gradually move outward and partially close or reduce the outlet area of the nozzle 2 until the stream ejected therefrom is properly proportioned to the work required of the wheel or motor 1.

By reason of the clutch mechanism interposed between the sleeve 25³ and the drive shaft 28², the rotation of the said shaft is considerably reduced over what it would be in case of a direct connection of the motor 25' to the drive shaft, hence the closing of the nozzle's outlet area is somewhat slow. The reason for this slow outward movement of the plug 25² to reduce the nozzle's outlet area, is that pounding or hammering in the pipe line may be obviated—which pounding or hammering takes place where the outlet area for the stream is suddenly reduced or cut down. The outward movement of the nozzle's plug 25² continues until the outlet port 22' of the cylinder 21 is closed by the inward movement of the valve 22, which, through the medium of the action of the lever 19', as hereinafter described, gradually closes the said port proportionately to the movement of the plug 25² to reduce the outlet area of the nozzle, so that by the time the outlet area for the water has been properly reduced to proportion the impact stream discharged from the nozzle to the changed load of the motor, the port 22' will be entirely closed and the nozzle's plug 25² brought to a state of rest.

To prevent what is known as "hunting" of the nozzle's plug for its position for effective work and to gradually cut off the supply for the drive motor 25' for the regulating mechanism of the plug 25², it is required that means be provided which will gradually reduce the speed of the drive motor 25' proportionately to the outward movement of the nozzle's plug, as the nozzle 2 returns to its normal position. This is accomplished, in the present case, by means of a traveling nut 30', which works upon the screw-threaded portion 30² of the drive shaft 28². To this traveling nut 30' is attached the lower end of a pivoted lever 30³, which lever in turn is connected to the lower end of the lever 19' by the connecting link 31. As the drive shaft 28² is rotated to operate the plug 25² to close the outlet area of the nozzle 2, the nut 30' is moved inward or toward the casing 24², swinging therewith the pivoted lever 30³, which, through its connection 31, exerts an inward pull upon the lower end of the lever 19' in order to gradually draw the same inward. This movement of the lever 19' acting upon the piston 22, through its connected piston rod 20', forces the said piston 22 inward to gradually close the outlet port 22'. By the time the plug 25² has reached a position which permits of the proper outlet opening for the impact stream, the piston 22 will stand to entirely close the outlet port 22', when the supply for the motor 25' being cut off, the parts will be brought to a positive state of rest or equilibrium. It will be observed that the speed of the motor 25' is gradually reduced in accordance with the reduction of the nozzle's outlet area, hence the plug 25² is gradually brought to a state of rest and vibration or hunting for its proper position is obviated.

As the quantity of water discharged onto the vanes, blades or buckets 3 of the water wheel 1 is reduced, a corresponding reduction in the speed of the wheel results and likewise in the speed of the governor mechanism 5, the fly balls 6 of which drop to their normal position. With the reduction of the governor's speed, the action of the fly balls causes the valve stem 7 to slowly descend, forcing the valve 8 inward to close port 12.

These various operations may be said to be substantially synchronous.

With an increase load being placed upon the water wheel, the working thereof slows down and a heavier stream is required to act against the buckets, vanes or blades 3 to compensate for such increase in the working load. As the wheel slows down with the increase load placed thereon, the governor's speed decreases and the fly balls 6 fall below normal. During this movement of the fly balls the stem 7 is gradually forced downward, which carrying therewith the piston or valve 8 moves the same to uncover the outlet port 12'. Water is thus admitted from cylinder 9 through connection 13' into the cylinder 14² in front of the piston 15, the water pressure forcing the said piston inward. The stem 15, moving therewith throws the lever 16 in a corresponding direction, which operates the shaft 16' to throw the outer end of the arm 16² upward and raise the nozzle 2 through the medium of the connecting link 17. At the same time the block 18' acting against the spring 19² forces the upper end of the lever 19' inward, which in turn imparts a similar movement to the piston rod 20' to operate the piston 22 to uncover outlet port 23. The water under pressure escaping from the cylinder 21 is delivered onto the motor 25 through the connection 24'. The water pressure thus admitted into the casing 24² through the connection 24' drives the wheel or motor 25 in an opposite direction to that given to the wheel or motor 25'. This wheel or motor 25 being secured directly to the drive shaft 28² transmits its motion thereto, which in turn is imparted to the shaft 28' through the connection 29. As before stated, the motion of shaft 28' is transmitted to the rod 26' through the medium of the gear and pinion 27' and 28, but in this case an opposite rotation is transmitted to the rod 26 than is given thereto when actuated by the movement of the wheel or motor 25', consequently the rod 26 is gradually drawn outward and the plug 25² moved backward so as to gradually enlarge the outlet area of the nozzle 2. This is necessary in order that a heavier stream may be discharged therefrom to compensate for the increased load placed onto the driven wheel 1. As the speed of the motor is not cut down by the interposition of clutch mechanism and gearing, a quick movement is imparted to the plug 25² to open the outlet of the nozzle. During this operation of the drive shaft 28², the nut 30' travels outwardly, swinging the lever 30³ therewith and through the connection 31 forcing the lower portion of the lever 19' outward, which, drawing the rod 20', moves the piston 22 to gradually close the outlet port 23 in order that the wheel or motor 25 may be brought to a state of rest the moment the plug 25² affords the required outlet area of the nozzle for the impact or propelling stream.

As the parts come to a state of rest, the nozzle 2 will stand in its normal position for the effective discharge of the impact stream.

In place of the wheels 25 and 25' any suitable form of mechanism actuated by the increased or the decreased speed of the governor mechanism may be employed for actuating the rod 26 to shift the plug 25² for the purpose of closing and opening the outlet of the nozzle 2.

While the foregoing describes the nozzle 2 as a deflecting nozzle, it is not to be understood that the invention is confined to such form of nozzle. The nozzle may be a fixed one, as disclosed by Fig. 3 of the drawings, in which case there is hinged to the outer end thereof a deflecting or cut off gate 29². This gate is raised and lowered by the action of the connecting link 17, in the same manner as the nozzle 2 is deflected and raised.

Having thus described the invention, what I claim as new and desire to protect by Letters Patent, is—

1. In a hydraulic regulating means, the combination with the hydraulic motor, of a governor, a nozzle, a plug for regulating the outlet area of the nozzle, means for imparting movement to the plug in one direction, including a shaft connecting with the plug, and a drive wheel connected to the shaft, and means for imparting reverse movement to the plug, including a sleeve mounted upon the shaft, a drive wheel carried by the sleeve, and means for connecting the sleeve to the shaft, a lever connected with the shaft and a connected supplemental lever operatively associated with the governor, whereby the operation of the plug is regulated by the movement of the governor.

2. In a hydraulic regulating means, the combination with the hydraulic motor, of a governor, a pivoted nozzle, and means for automatically adjusting the nozzle on its pivot including a sliding piston controlled by the governor, a stem for the piston having a rack thereon, a pivoted toothed segment lever connected with said rack, and lever connections between said segment lever and the nozzle, in combination with means for regulating the cross sectional area of the discharge of the nozzle, to vary the same proportionately to the working load of the motor, the said means including a reciprocatory plug for the nozzle, actuating devices therefor and connecting devices including gearing interposed between one of the actuating devices and plug, and means for bringing said actuating device and gearing into play only when movement in one direction is to be imparted to the plug.

3. The combination with a hydraulic motor, of the governor mechanism, a nozzle for the discharge of an impact or propelling stream onto the motor, of means actuated by the governor mechanism for varying the direction of the discharged stream, automatically operated means for varying the discharge of the nozzle proportionately to the working load of the motor, said means having associated therewith devices for bringing said means to a positive state of rest the moment the nozzle's discharge has been proportioned to the working load of the motor.

4. In an hydraulic apparatus, the combination with a water wheel provided on its periphery with a series of buckets of a deflectable nozzle for discharging an impact stream onto the buckets of the water wheel, of a needle valve arranged within the nozzle, of governor mechanism for controlling the deflection of the nozzle in accordance with load changes, of hydraulic means actuated by said mechanism for gradually moving the needle valve within the nozzle to vary the discharge of the said nozzle in accordance with changed positions thereof to place the impact stream wholly or partially onto and off the buckets of the water wheel, and of devices associated with said means for bringing the same to a state of rest upon the nozzle discharge being proportioned to the working load of the motor.

5. In a hydraulic regulating means, the combination with the hydraulic motor, of a governor, a pivoted nozzle, and means for automatically adjusting the nozzle on its pivot, including a cylinder, a slide valve within the cylinder actuated by said governor, a supply inlet for the cylinder, a piston cylinder, a sliding piston within the cylinder, a connection between said cylinders whereby according to the operation of the governor, the piston will be reciprocated; a stem for the piston having a rack thereon, a pivoted toothed segment lever connected with said rack, and lever connections between said segment lever and the nozzle in combination with means for regulating the cross sectional area of the discharge of the nozzle to vary the same proportionately to the working load of the motor, the said means including a reciprocatory plug for the nozzle, motors therefor and connections between the motors and the plug, said connections including gearing independently actuated by one of the motors to impart the forward movement to the plug.

6. In a hydraulic regulating means, the combination with the hydraulic motor, of a governor, a pivoted nozzle, and means for automatically adjusting the nozzle on its pivot including a reciprocating arm, and means operatively associated with said arm for regulating the cross sectional area of the discharge of the nozzle to vary the same proportionately to the working load of the motor, the said means including a reciprocatory plug for the nozzle, a valve mechanism operative by the movement of said arm, hydraulic motor devices for imparting backward and forward movements to said plug, connections between said valve mechanism and said motor devices whereby the latter are set into operation by the former, and means for bringing the plug actuating means to a positive state of rest the moment the nozzle's discharge has been proportioned to the working load of the motor.

7. The combination with a hydraulic motor, of the governor mechanism, a nozzle for the discharge of an impact or propelling stream onto the motor, and means controlled by the governor for varying the discharge of the nozzle, including a reciprocatory plug for the nozzle, and gearing therefor constructed and arranged to permit the closing movement of the plug to be relatively slower than the opening movement thereof.

8. The combination with a hydraulic motor, of the governor mechanism, a nozzle for the discharge of an impact or propelling stream onto the motor, and means for varying the discharge of the nozzle including a reciprocatory plug and a plurality of hydraulic motors having connections with, and operating respectively according to the movement of the governor to impart forward and back movements to the plug, connection between said motors and plug and said connection being constructed and arranged to permit the forward movement of the plug to be relatively slow.

9. The combination with a hydraulic motor of a governor mechanism, a nozzle for the discharge of an impact stream, and means for varying the discharge of the nozzle, including a reciprocatory plug, a plurality of oppositely acting hydraulic motors controlled by the governor mechanism to impart forward and back movements to the plug, connections between the motors and the plug, the connection between one of the motors and the plug including a series of interposed gears constructed and arranged to cause the forward movement of said plug to be relatively slow.

10. In a hydraulic regulating means, the combination with a hydraulic motor, of a governor, a pivoted nozzle, and means for automatically adjusting the nozzle on its pivot including a sliding piston actuated by the governor, a stem for the piston having a rack thereon, a pivoted toothed segment lever connecting with said rack, and lever connections between said segment lever and the nozzle, in combination with means for regulating the cross sectional area of the discharge of the nozzle to vary the same proportionately to the working load of the motor, the said means including a reciprocatory plug for the nozzle, and means for imparting forward and back movements to said plug including a plurality of hydraulic motors, a supply cylinder having communication with the respective motors, a piston in said cylinder, a stem for the piston, an operating lever having pivotal connection with said stem and operatively connected with the said stem of the first mentioned piston, and means whereby the actuating devices for the plug will be brought to a state of rest upon the nozzle's discharge being proportioned to the working load of the motor.

In witness whereof I have hereunto set my hand.

GEORGE J. HENRY, JR.

Witnesses:
WALTER F. VANE,
D. B. RICHARDS.